United States Patent [19]

Takano et al.

[11] 3,971,039

[45] July 20, 1976

[54] INK JET SYSTEM PRINTER WITH TEMPERATURE COMPENSATION

[75] Inventors: Rikuo Takano, Gusashino; Yuji Sumitomo, Nara; Yoichi Yamamoto, Nara; Tomoo Makita, Nara; Masahiko Aiba, Nara, all of Japan

[73] Assignees: Nippon Telegraph and Telephone Public Corporation, Tokyo; Sharp Kabushiki Kaisha, Osaka, both of Japan

[22] Filed: Nov. 25, 1974

[21] Appl. No.: 526,824

[30] Foreign Application Priority Data

Nov. 24, 1973 Japan .............................. 48-135821

[52] U.S. Cl. .............................. 346/75; 346/140 R

[51] Int. Cl.[2] .............................. G01D 18/00

[58] Field of Search .............................. 346/75, 140, 1

[56] References Cited

UNITED STATES PATENTS

| | | | |
|---|---|---|---|
| 2,600,129 | 6/1952 | Richards | 346/75 X |
| 3,787,882 | 1/1974 | Fillmore et al. | 346/75 |
| 3,828,354 | 8/1974 | Hilton | 346/75 X |
| 3,914,772 | 10/1975 | Kashio | 346/75 |

OTHER PUBLICATIONS

Sweet, R. G.; High–Frequency Oscillography with Electrostatically Deflected Ink Jets; Stanford Electronics Labs, Sel.–64–004, 1964, pp. 45–46.

*Primary Examiner*—Joseph W. Hartary
*Attorney, Agent, or Firm*—Stewart and Kolasch, Ltd.

[57] ABSTRACT

The size of patterns printed by an ink jet system printer including an ink liquid issuing nozzle, a charging electrode and deflection electrodes is temperature dependent. When the ink liquid temperature increases, viscosity of the ink liquid reduces and hence a flow rate of the ink liquid increases. This causes both mass and a flying rate of an ink droplet emitted from the nozzle to increase. Therefore, a deflection amount becomes smaller and hence the printed pattern size becomes smaller than that of ordinary desired. A temperature senser is provided on an ink conduit adjacent to the nozzle, for detecting the ink liquid temperature and generating detecting signals. A voltage level of video signals applied to the charging electrode or a voltage level applied to the deflection electrodes is varied in accordance with the detecting signals in order to stabilize the size of the printed pattern. When the ink liquid temperature increases, the voltage level of the video signals applied to the charging electrode or the voltage level applied to the deflection electrodes is compensatively increased.

8 Claims, 5 Drawing Figures

FIG. 3 (Variable Gain Control Video Amplifier -12-)

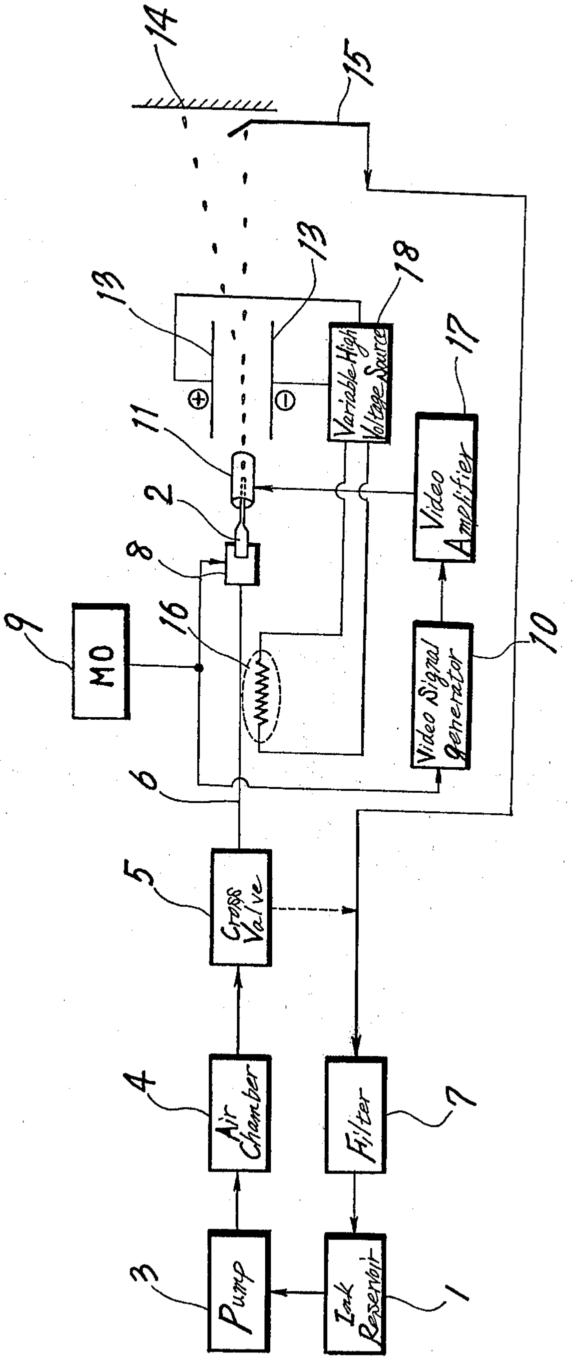
FIG. 4
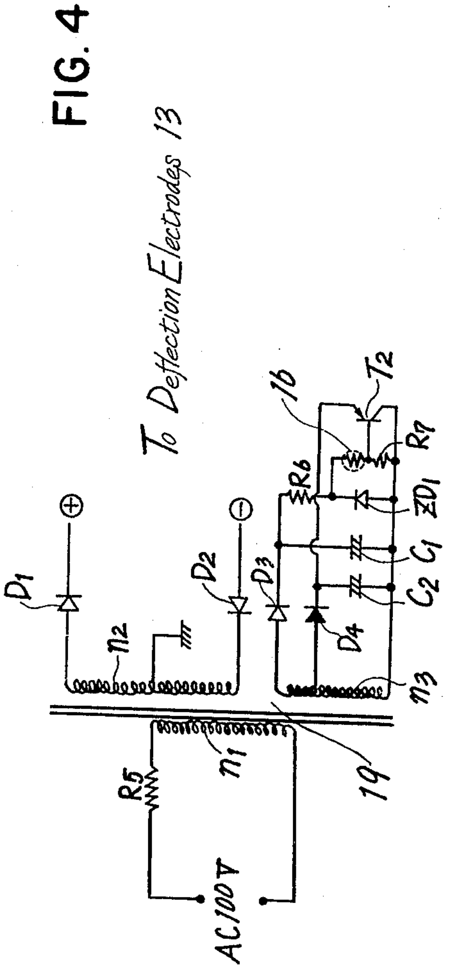
FIG. 5 (Variable High Voltage Source -18-)

INK JET SYSTEM PRINTER WITH TEMPERATURE COMPENSATION

BACKGROUND OF THE INVENTION

The present invention relates to an ink jet system printer and more particularly relates to an improvement to stabilize printed pattern size in an ink jet system printer.

In an ink jet system printer including a nozzle for issuing ink liquid toward a recording paper, a charging electrode and deflection electrodes, pattern size printed on the recording paper varies when ink liquid temperature varies. When the ink liquid temperature increases, viscosity of the ink reduces and hence a flow rate of the ink liquid increases. This causes both a mass and a flying rate of an ink droplet emitted from the nozzle to increase. Therefore, a deflection amount of the ink droplet becomes smaller and hence the pattern size printed on the paper becomes smaller than that of ordinary desired. This variation in size of printed pattern is not desirable for the ink jet system printer.

OBJECTS AND SUMMARY OF THE INVENTION

Accordingly, an object of the present invention is to stabilize pattern size printed on a recording paper in an ink jet system printer.

Another object of the present invention is to provide a device which stabilizes the pattern size printed on the recording paper without regard to variations of ink liquid temperature supplied to a nozzle.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, the ink jet system printer of the present invention is provided with a temperature senser attached to an ink conduit to the nozzle for detecting the ink liquid temperature and generating detecting signals. A voltage level of video signals applied to a charging electrode or a voltage level applied to deflection electrodes is varied in accordance with the detecting signals in order to stabilize the size of the printed pattern. When the ink liquid temperature increases, the voltage level of the video signals applied to the charging electrode or the voltage level applied to the deflection electrodes is increased, thereby the pattern size printed on the recording paper is stabilized even though both mass and a flying rate of an ink droplet emitted from the nozzle increase.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

FIG. 4 is a schematic diagram showing another embodiment of the present invention; and FIG. 5 is a detailed circuit diagram of an example of a variable high voltage source of FIG. 4.

DESCRIPTION OF THE PREFERRED EMBODIMENTS

Referring now in detail to the drawings, and to facilitate a more complete understanding of the present invention, the characteristics of the ink liquid used in the ink jet system printer of the present invention and variation in the height of the printed character printed by a prior art ink jet system printer will be first described with reference to FIG. 1.

Figure 1:
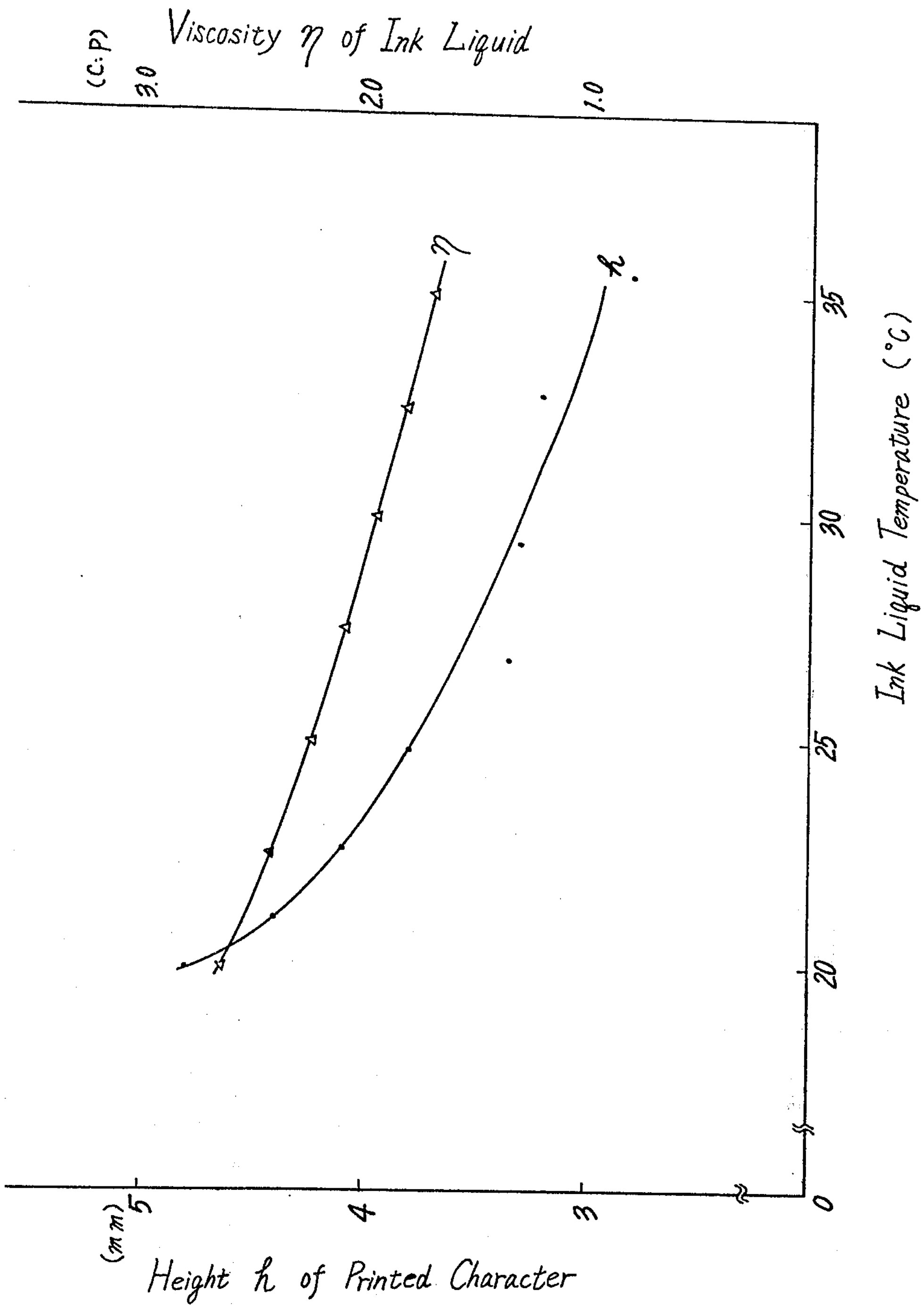
FIG. 1 is a graph showing viscosity $\eta$ of ink liquid and height $h$ of printed character versus ink liquid temperature characteristics of ink liquid used in an ink jet system printer and of printed pattern printed by an ink jet system printer.

FIG. 1 shows the relationships between the temperature (along the abscissa axis) and the viscosity (along the first ordinate axis) and between the temperature and height of the printed character (along the second ordinate axis). In general, in an ink jet system printer, ink liquid temperature in an ink liquid supply system including a pump, an air chamber, an electromagnetic cross valve and a nozzle varies in accordance with variations of the ambient temperature conditions. Variations in temperature of the ink liquid cause variations in the viscosity and the height of the printed character. It is clear from FIG. 1 that both the viscosity and the height of printed character increase when the ink liquid temperature is reduced. The variation in height of the printed character, though the variation is not desirable in the ink jet system printer, may be caused in the following fashion. When the ink liquid temperature increases, the viscosity of the ink liquid is reduced and hence a flow rate of the ink liquid within the ink liquid supply system increases. This causes both the mass and a flying rate of an ink droplet emitted from the nozzle to increase. Therefore, the amount of deflection of the ink droplet and hence the height of the printed character on a recording paper becomes small.

If a voltage level of video signals applied to charging electrode or a deflection voltage applied to deflection electrodes is increased when the ink liquid temperature increases, the ink droplet will reach a desired position on the recording paper.

Figure 2:
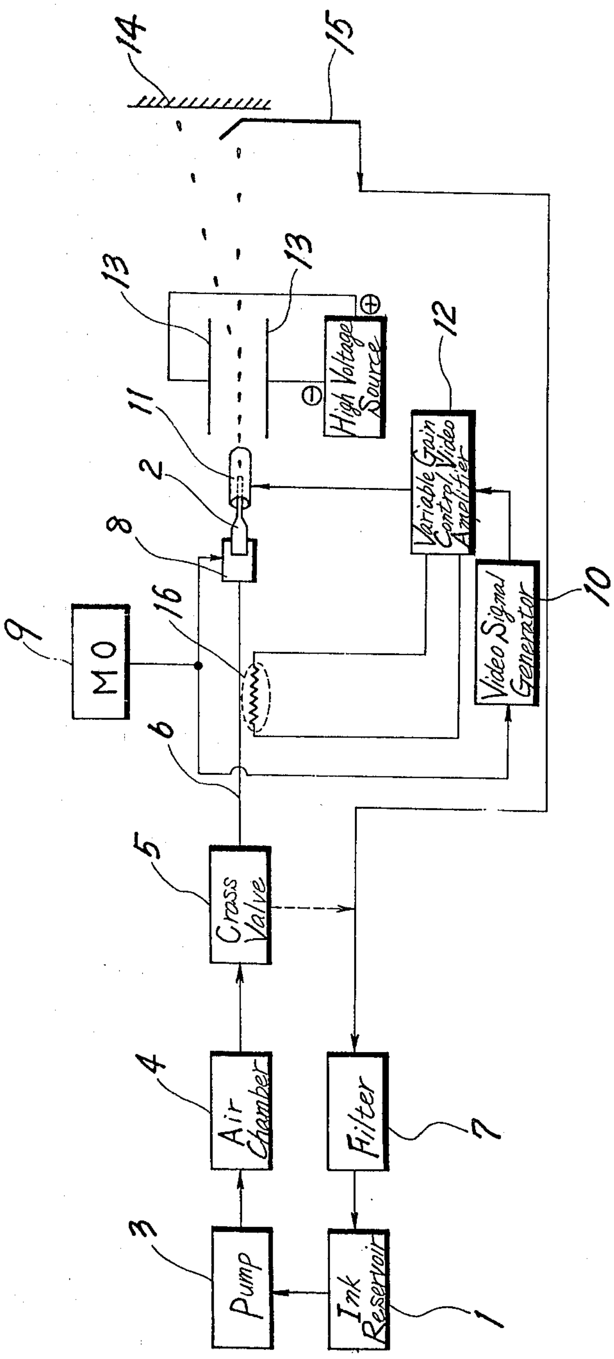
FIG. 2 is a schematic diagram showing an embodiment of the present invention.

FIG. 2 shows an embodiment of the present invention, wherein the present invention is adapted to the ink yet system printer of the charge amplitude controlling type, although the present invention will also be applied to the ink jet system printer of the deflection voltage controlling type.

Ink liquid contained within an ink reservoir 1 is sent under pressure to a nozzle 2 through a pump 3, an air chamber 4, an electromagnetic cross valve 5 and a conduit 6. The air chamber 4 is provided for minimizing the pressure pulsation caused by the pump 3. The electromagnetic cross valve 5 is provided for controlling the supply direction of the ink liquid. The ink liquid is supplied from the pump 3 to the nozzle 2 through the conduit 6 when the printing operation is performed, and the ink liquid is returned from the nozzle 2 and conducted to the ink reservoir 1 through a filter 7 when the ink jet system printer ceases its operation.

The nozzle 2 is held by an ink droplet issuance unit 8 including an electromechanical transducer such as a piezo-vibrator of a type well known in the art. The ink liquid issuing from the nozzle 2 is excited by the electro-mechanical transducer so that ink droplets of a frequency equal to the exciting frequency from a master oscillator 9 are formed.

A video signal generator 10 provides charging signals or video signals corresponding to the printing information, which are then applied to a charging electrode 11 through a variable gain control video amplifier 12. The charging signals are synchronized with the exciting signals from the master oscillator 9 and are timed in agreement with the ink droplet separation phase in order to charge the individual ink droplets with the charge amplitude corresponding to the printing information in a manner well known in the art. As the ink droplets charged with the charging signals pass through a constant high voltage electric field established by a pair of high voltage deflection plates 13, the droplets are deflected in accordance with the amplitude of charges on the droplets and deposited on a recording paper 14 to print a desired patter. The ink droplets are issued continuously, and ink droplets not contributive to writing operation are neither charged nor deflected and therefore are directed toward a beam gutter 15 in order to recirculate the waste ink liquid to the ink reservoir 1 through the filter 7.

A temperature senser 16 such as thermistor is attached to the conduit 6 adjacent to the nozzle 2 for detecting the ink liquid temperature and generating detecting signals. The detecting signals are introduced into the variable gain control video amplifier 12 whereby the voltage level of the video signals from the video signal generator 10 is amplified and compensated in accordance with the detecting signals in order to stabilize or unify the size of the pattern being printed without regard to variations of the temperature of the ink liquid supplied to the nozzle 2. The compensatively amplified video signals are applied to the charging electrode 11. When the ink liquid temperature increases, the voltage level of the video signals applied to the charging electrode 11 is compensatively increased, thereby the size of pattern being printed on the recording paper 14 is stabilized since the charge amplitude on the ink droplet is compensatively increased even though both mass and a flying rate of the ink droplet emitted from the nozzle 2 increase.

Figure 3:
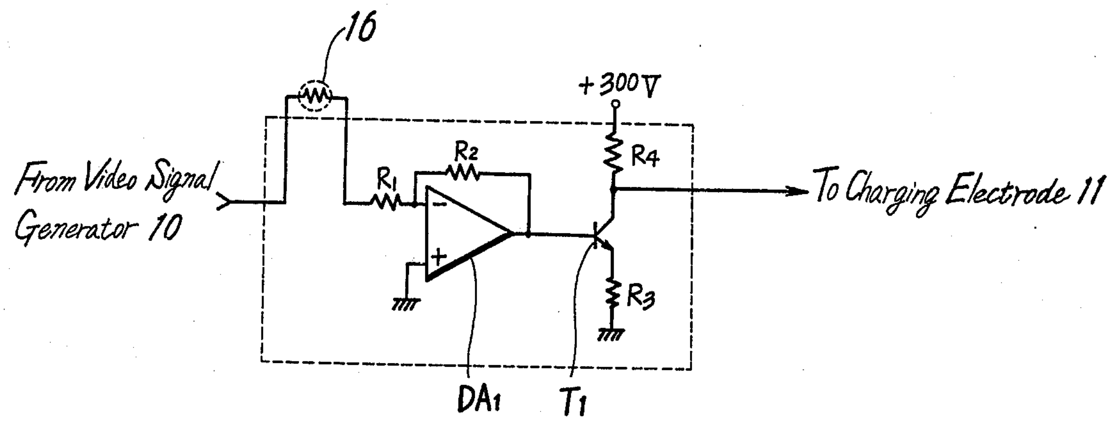
FIG. 3 is a detailed circuit diagram of an example of a variable gain control video amplifier of FIG. 2.

FIG. 3 is a detailed circuit diagram showing an example of the variable gain control video amplifier 12.

The variable gain control video amplifier 12 mainly comprises a first stage including a differential amplifier $DA_1$ and resistors $R_1$ and $R_2$, and a second stage including a transistor $T_1$ and resistors $R_3$ and $R_4$. The video signals from the video generator 10 are conducted to the negative input terminal of the differential amplifier $DA_1$ through the temperature senser 16 and the resistor $R_1$. The gain A of the variable gain control video amplifier 12 can be expressed as follows:

$$A \doteqdot \frac{R_2}{R_{TH} + R_1} \cdot \frac{R_4}{R_3}$$

Where $R_{TH}$ is the resistance value of the temperature senser 16.

Decrease of the ink liquid temperature causes the resistance value $R_{TH}$ of the temperature senser 16 to increase and hence the gain A of the variable gain control video amplifier 12 becomes lower than that of ordinary performed. Conversely, increase of the ink liquid temperature causes the resistance value $R_{TH}$ of the temperature senser 16 to decrease and hence the gain A of the variable gain control video amplifier 12 becomes higher than that of ordinary generated. The output of the variable gain control video amplifier 12 is conducted to the charging electrode 11, and therefore, the ink droplets are charged by the compensatively amplified video signals. The compensation value or rate is controllable by adjusting the ratio between the resistance values of the resistor $R_1$ and the temperature senser 16.

Referring not to FIG. 4, showing another embodiment of the present invention, wherein like elements corresponding to those of FIG. 2 are indicated by like numerals.

In this embodiment the detecting signals from the temperature senser 16 are introduced into a variable high voltage source 18 in order to compensatively vary the deflection voltage applied to the pair of deflection electrodes 13 in accordance with the variations of the ink liquid temperature. The video signals generated by the video signal generator 10 are merely amplified by a video amplifier 17 and then applied to the charging electrode 11.

FIG. 5 is a detailed circuit diagram showing an example of the variable high voltage source 18.

The variable high voltage source 18 mainly comprises a transformer 19 including a primary winding $n_1$, a secondary winding $n_2$ and an auxiliary winding $n_3$. The primary winding $n_1$ is connected with an AC source of 100 volts via a resistor $R_5$. Each end of the secondary winding $n_2$ is connected with the pair of deflection electrode 13 via diodes $D_1$ and $D_2$, respectively. Both ends of the auxiliary winding $n_3$ are connected each other through a diode $D_3$, a resistor $R_6$ and a Zener diode $ZD_1$. A capacitor $C_1$ is provided in a fashion parallel to the series of the resistor $R_6$ and the Zener diode $ZD_1$. A series of the temperature senser 16 and a resistor $R_7$ is connected across the Zener diode $ZD_1$. A series of a diode $D_4$ and a capacitor $C_2$ is connected between one end and a center tap of the winding $n_3$. A transistor $T_2$ is provided in a fashion parallel to the capacitor $C_2$, the base of the transistor $T_2$ being connected with a point which is between the temperature senser 16 and the resistor $R_7$.

When the ink liquid temperature increases, the resistance value of the temperature senser 16 becomes small and hence the level of voltage applied to the base electrode of the transistor $T_2$ becomes high. Therefore, power consumption at the transistor $T_2$ becomes small since the base of the transistor $T_2$ is biased in a reverse direction. Following the reduction of the power consumption at the transistor $T_2$, the electrode current through the primary winding $n_1$ is reduced and hence the voltage drop at the resistor $R_5$ becomes small and therefore the voltage level applied across the primary winding $n_1$ becomes high. Under these conditions, the deflection voltage higher than that of ordinary produced is applied to the deflection electrodes 13 by the secondary winding $n_2$, thereby the ink droplet is deflected and therefore impinges the desired position on the recording paper 14 even though both mass and flying rate of the ink droplet increases and the charging voltage is not varied. Conversely, when the ink liquid temperature decreases, the resistance value of the temperature senser 16 becomes large and hence the power consumption at the transistor $T_2$ becomes large. The electric current through the primary winding $n_1$ is increased and therefore the voltage level appearing across the primary winding $n_1$ and the secondary winding $n_2$ becomes low, thereby compensatively decreased deflection voltage is applied to the deflection electrodes 13.

In accordance with teachings of the present invention the voltage level of the video signals applied to the charging electrode or the voltage level applied to the deflection electrode is automatically varied with reference to the variations of the ink liquid temperature. The ink droplets impinge the desired portions on the recording paper without regard to the variations of the ink liquid temperature.

The invention being thus described, it will be obvious that the same way be varied in many ways. Such variations are not to be regarded as a departure from the spirit and scope of the invention, and all such modifications are intended to be included within the scope of the following claims.

What is claimed is:

1. In an ink jet system printer including a nozzle unit for emitting ink droplets toward a recording paper, a conduit for conducting ink liquid to the nozzle, a charging electrode for charging the ink droplets and deflection electrodes for establishing an electric field in order to deflect the charged ink droplets, the improvement comprising:

a temperature sensor attached directly to or adjacent to the conduit for detecting ink liquid temperature;

compensation means coupled with the temperature sensor for compensatively varying a voltage level applied to the charging electrode in accordance with the variations of the ink liquid temperatre, said compensation means including a differential amplifier adapted to receice the video signals through the temperature sensor at one receive terminal thereof and voltage amplifying means including a transistor, the base of which is connected to receive the output signals of the differential amplifier, the output signals of the amplifying means being applied to the charging electrode;

a video signal generator for generating video signals in accordance with printing information; and wiring means for coupling the video signals with the charging electrode via said compensation means.

2. The ink jet system printer of claim 1 wherein said temperature sensor is made of a thermistor.

3. In an ink jet system printer including a nozzle unit or emitting ink droplets toward a recording paper, a conduit for conducting ink liquid to the nozzle, a charging electrode for charging the ink droplets and deflection electrodes for estabilishing an electric field in order to deflect the charged ink droplets, the improvement comprising:

a temperature sensor attached directly to or adjacent to the conduit for detecting ink liquid temperature; and compensation means coupled with the temperature sensor for compensatively varying a voltage level applied to the deflection electrodes in accordance with the variations of the ink liquid temperature, said compensation means including a transformer including a primary winding connected with an AC source, a secondary winding connected with the deflection electrodes and an auxiliary winding connected with the temperature sensor for varying an electric current appearing through the primary winding in accordance with the variations of the ink liquid temperature.

4. The ink jet printer of claim 3 wherein said temperature sensor is a thermistor.

5. An ink jet system printer of the charge amplitude controlling type comprising:

a nozzle unit for emitting ink droplets;

a conduit for conducting ink liquid to the nozzle;

a charging electrode for charging the ink droplets;

a video signal generator for generating video signals in accordance with printing information;

a temperature sensor attached directly to or adjacent to the conduit for detecting ink liquid temperature;

a variable gain control video amplifier coupled with the temperature sensor for compensatively varying a voltage level of the video signals in accordance with the variations of the ink liquid temperature;

means for applying the compensatively varied video signals to the charging electrode;

a pair of deflection electrodes for establishing a fixed high voltage electrode field in order to deflect the charged ink droplets; and a record receiving member for receiving the deflected ink droplets.

6. The ink jet system printer of claim 5 wherein the variable gain control video amplifier is adapted to compensatively increase the voltage level of the video signals when the ink liquid temperature increases.

7. An ink jet system printer of the charge amplitude controlling type comprising:

a nozzle unit for emitting ink droplets;

a vibrator attached to the nozzle for exciting the nozzle in order to produce the ink droplets at a given frequency;

a conduit for conducting ink liquid to the nozzle;

a charging electrode for charging the ink droplets;

a video signal generator for generating video signals in accordance with printing information;

a video amplifier for amplifying the video signals and applying the charging signals to the charging electrode;

a pair of deflection electrodes for establishing an electric field in order to deflect the charged ink droplets;

a temperature sensor attached directly to or adjacent to the conduit for detecting ink liquid temperature;

a variable high voltage source coupled with the temperature sensor for applying compensatively varied deflection voltage to the deflection electrodes, the deflection voltage being varied in accordance with variations of the ink liquid temperature; and a record receiving member for receiving deflected ink droplets.

8. The ink jet system printer of claim 7 wherein the variable high voltage source is adapted to compensatively increase the voltage level of the deflection voltage when the ink liquid temperature increases.

* * * * *